(12) United States Patent
Snowdon (10) Patent No.: US 11,438,276 B2
(45) Date of Patent: Sep. 6, 2022

(54) METHOD AND SYSTEM FOR PRIORITIZING NETWORK TRAFFIC DATA UNITS

(71) Applicant: METAMAKO GENERAL PTY LTD IN ITS CAPACITY AS GENERAL PARTNER OF METAMAKO TECHNOLOGY LP, Sydney (AU)

(72) Inventor: David Snowdon, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 38 days.

(21) Appl. No.: 17/045,979

(22) PCT Filed: May 29, 2019

(86) PCT No.: PCT/AU2019/050536
§ 371 (c)(1),
(2) Date: Oct. 7, 2020

(87) PCT Pub. No.: WO2019/227153
PCT Pub. Date: Dec. 5, 2019

(65) Prior Publication Data
US 2021/0367898 A1      Nov. 25, 2021

(30) Foreign Application Priority Data

May 29, 2018  (AU) ................................ 2018901890

(51) Int. Cl.
*H04L 47/34* (2022.01)
*H04L 43/0852* (2022.01)
*H04L 47/70* (2022.01)
*H04L 69/28* (2022.01)

(52) U.S. Cl.
CPC .......... *H04L 47/34* (2013.01); *H04L 43/0852* (2013.01); *H04L 47/826* (2013.01); *H04L 69/28* (2013.01)

(58) Field of Classification Search
CPC ... H04L 47/34; H04L 43/0852; H04L 47/826; H04L 69/28
See application file for complete search history.

(56) References Cited

U.S. PATENT DOCUMENTS

| | | | |
|---|---|---|---|
| 11,102,053 B2 * | 8/2021 | Ponnuswamy | H04L 43/04 |
| 11,153,044 B2 * | 10/2021 | Shim | H04L 5/0094 |
| 11,170,001 B2 * | 11/2021 | Rickert | G06F 16/22 |
| 11,196,669 B2 * | 12/2021 | Shahraray | G06N 20/00 |
| 2009/0268612 A1 | 10/2009 | Felderman | |
| 2012/0093162 A1 | 4/2012 | Alfano | |

(Continued)

*Primary Examiner* — Chandrahas B Patel
(74) *Attorney, Agent, or Firm* — Chamberlain, Hrdlicka, White, Williams & Aughtry (57) ABSTRACT

In general, the embodiments relate to systems and methods for receiving and processing network traffic data units (NTDUs) by one or more edge devices in order to generate a global ordering of NTDU. The methods include receiving, at an aggregator, a first set of locally ordered NTDUs from a first edge device, receiving, at the aggregator, a second set of locally ordered NTDUs from a second edge device, generating a globally ordered sequence of NTDUs using the first set of locally ordered NTDUs and the second set of locally ordered NTDUs; and transmitting the globally ordered sequence of NTDUs to a destination.

21 Claims, 7 Drawing Sheets

(56) References Cited

U.S. PATENT DOCUMENTS

2016/0294921 A1 10/2016 Meng
2017/0070547 A1 3/2017 Falk
2018/0091570 A1 3/2018 Hardt

* cited by examiner

METHOD AND SYSTEM FOR PRIORITIZING NETWORK TRAFFIC DATA UNITS

BACKGROUND

In some scenarios, network traffic data units (e.g., packets, frames, tunneling protocol frames, etc.) need to be prioritized by the processing data device according to the time that the packets are received. Clients sending network traffic data units may experience different delays as the network traffic data units travel through a network of network devices (e.g., switches and/or routers) to a data processing device. Consequently, the network traffic data units may not be processed in the order that they are received by lower level network devices (e.g., edge network devices). Consequently, the data processing device may not be processing the network traffic data units on a first-come-first serve basis as intended. Also, some clients may exploit behavior(s) of various network devices within a network in an attempt to ensure that the client's one or more network traffic data units are processed ahead of the network traffic data units of other clients.

SUMMARY

In general, in one aspect, the invention relates to a method for processing network traffic data units (NTDUs). The method includes receiving, at an aggregator, a first set of locally ordered NTDUs from a first edge device, receiving, at the aggregator, a second set of locally ordered NTDUs from a second edge device, generating a globally ordered sequence of NTDUs using the first set of locally ordered NTDUs and the second set of locally ordered NTDUs, and transmitting the globally ordered sequence of NTDUs to a destination.

In general, in one aspect, the invention relates to an aggregator. The aggregator includes a plurality of ingress queues comprising a first ingress queue and a second ingress queue, a plurality of ports configured to receive network traffic data units (NTDUs), wherein the aggregator is configured to: receive, at the aggregator, a first set of locally ordered NTDUs from a first edge device, receive, at the aggregator, a second set of locally ordered NTDUs from a second edge device, generate an ordered sequence of NTDUs using the first set of locally ordered NTDUs and the second set of locally ordered NTDUs, and transmit the ordered sequence of NTDUs to a destination.

DETAILED DESCRIPTION

Specific embodiments will now be described with reference to the accompanying figures. In the following description, numerous details are set forth as examples of the embodiments. It will be understood by those skilled in the art, and having the benefit of this Detailed Description, that one or more embodiments may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, the embodiments relate to systems and methods for receiving and processing network traffic data units (NTDUs). Specifically, in one or more embodiments, one or more NTDUs are received at a data processing device subsequent to arrival at one or more edge devices of a network.

In one or more embodiments, a data processing device is configured to receive one or more NTDUs related to request that the data processing device perform one or more actions. In one or more embodiments, such actions are time sensitive, and, as such should be performed at the order in which they were received by edge network devices of a network to which the data processing device is operatively connected. In such scenarios, an aggregator, which may or may not be part of the data processing device, includes functionality to queue received NTDUs and process such NTDUs (or provide the NTDUs to a data processing device for processing) based on a timestamp added by edge network devices indicating the time the NTDUs were received at the network rather than the time the NTDUs were received by the aggregator.

Such systems and methods may create scenarios where data distributed to and/or received from data recipients occurs in a manner that is more fair, as no data recipient may gain an advantage over others by causing situations where a given data recipient is able to receive or transmit data more quickly than other data recipients.

For example, financial instruments (e.g., stocks, bonds, etc.) are often traded using technology housed at the physical location of exchanges on which the financial instruments are traded. One or more computing devices may make up at least a portion of the exchange, and may interface, via a network (e.g., a topology of routers, multi-layer switches, top-of-rack switches, bridges, etc. that provide connectivity between computing devices), with one or more computing devices (e.g., servers in a server rack) controlled by persons or entities that desire to receive information from the exchange and/or conduct trades via interacting with the exchange (i.e., trading entities).

A trading entity may gain an advantage over other trading entities if the computing devices under their control receive market data (e.g., price data, trade data, trade trend data, etc.) from the exchange and/or send orders (e.g., market orders or limit orders to buy or sell) to the exchange faster than the other trading entities, meaning the data received from or transmitted to an exchange may be considered time sensitive. In such a scenario, as to market data, a computing device of a trading entity may be a data recipient, and a computing device of an exchange may be a data processing device.

When such a scenario exists due to the actions of the trading entity gaining the advantage, the scenario may be considered unfair to the trading entities that end up at a disadvantage in speed of data receipt from or transmission of data to the exchange. Examples of such actions include, but are not limited to: using knowledge of network protocols (e.g., a multicast protocol) and the topology of computing devices and network devices of the network to cause certain network devices to perform worse than others (e.g., by causing queues to be consistently more full on certain network devices); modeling the latency characteristics of the network to gain knowledge not available to other traders; etc. Other examples of scenarios where fair delivery of time sensitive information is desired include, but are not limited to, computer gaming competitions, electronic gambling competitions, and real estate auctions.

In one or more embodiments, unfairness such as that discussed above may be mitigated, at least in part, using systems and methods that add ingress timestamps to NTDUs received at the edge of a network, thereby allowing a data processing device within the network to process network traffic data in an order based on the ingress timestamp rather than on the order in which such NTDUs are received by the data processing device.

Figure 1:
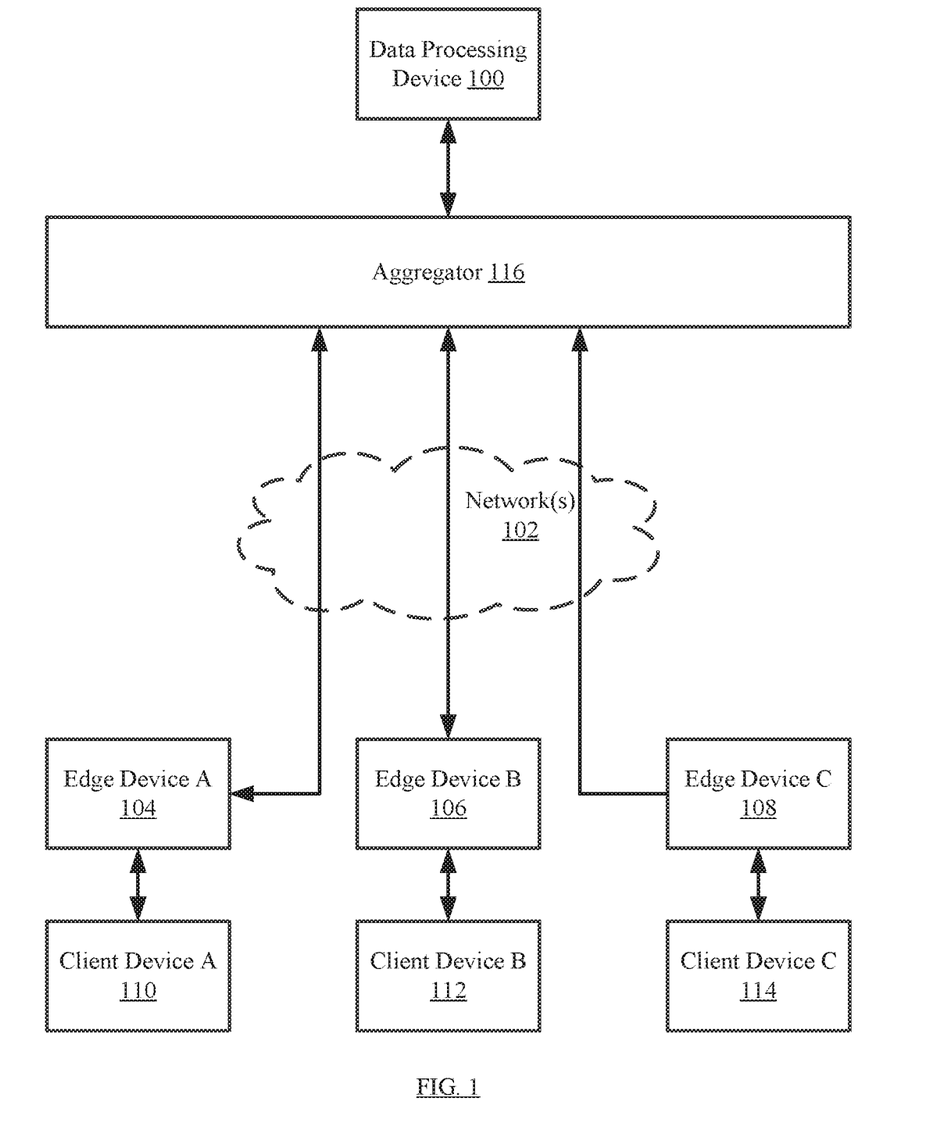
FIG. 1 shows a system in accordance with one or more embodiments described herein.

FIG. 1 shows a system in accordance with one or more embodiments. As shown in FIG. 1, the system includes one or more data processing devices (e.g., data processing device (100)), one or more edge devices (e.g., edge device A (104), edge device B (106), edge device C (108)), and one or more client devices (e.g., client device A (110), client device B (112), client device C (114)). The system may optionally include one or more network(s) (102). Each of these components is described below.

In one or more embodiments, client devices (110, 112, 114), may be implemented as computing devices. In one or more embodiments, a computing device is any device or any set of devices capable of electronically processing instructions and that includes, at least, one or more processors, memory, input and output device(s), and operative network connectivity to one or more network devices. Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer and/or any other mobile computing device), a network device (e.g., switch, router, multi-layer switch, etc.) and/or any other type of computing device with the aforementioned requirements.

In one embodiment of the technology, one or more client devices (110, 112, 114) include functionality to communicate with one or more one or more edge devices (104, 106, 108). Communicating with the edge devices (104, 106, 108) may cause NTDUs to be sent to the data processing device (100) via any number of intermediate devices, as discussed below.

In one or more embodiments, a data processing device (100) is any hardware (e.g., circuitry), software, firmware, or any combination thereof that includes functionality to receive NTDUs and to perform one or more actions based on the receipt of such NTDUs. For example the data processing device (100) may be a network device that includes and/or is operatively connected to a matching engine of a stock exchange, and may be configured to pass NTDUs to the matching engines.

In one or more embodiments, a data processing device (100) includes functionality to obtain data (e.g., market data) from one or more client devices (110, 112, 114), and/or to generate data desired by one or more client devices (110, 112, 114). In one or more embodiments, a NTDU is any relevant data that is transmitted in a format dictated by any one or more network protocols or standards. Examples of such protocols or standards include, but are not limited to, Internet Protocol (IP), Media Access Control (MAC), Transmission Control Protocol (TCP), User Datagram Protocol (UDP), InfiniBand, Hypertext Transfer Protocol (HTTP), etc. In one or more embodiments, the relevant data is at least a portion of the payload of a NTDU of any format.

In one or more embodiments, a data processing device (100) includes functionality to receive NTDUs from client devices (110, 112, 114). Such transmission of NTDUs may be achieved, at least in part, via one or more edge devices (104, 106, 108) and, in certain embodiments, one or more networks (102) interposed between the edge devices and data processing device (100). In one or more embodiments, a network (102) may be an entire network or any portion thereof. A network (102) may include a datacenter network, a wide area network, a local area network, a wireless network, a cellular phone network, or any other suitable network that facilitates the exchange of information from one part of the network to another. In one or more embodiments, the network (102) may be coupled with or overlap, at least in part, with the Internet. In embodiments in which a network(s) is interposed between the edge device and the data processing device or between the edge device and the aggregator (116), the network may include the following properties: (i) the local order of the NTDUs received at the individual edge devices is maintained during transmission through the network(s) until they reach the aggregator and (ii) the network(s) enables selective notifications to be sent from the aggregator to particular edges devices as part of a flow control mechanism (see e.g., FIG. 2 below). Depending on the implementation of the invention, there may be a separate network for each edge device. Alternatively, there may be single network or a set of networks shared by multiple edge device, where each of these networks has properties (i) and (ii) listed above.

In one or more embodiments, a network (102), and any network devices therein, may be arranged in any network topology. In one or more embodiments, a network topology is an arrangement of various devices of a network that facilitates the transmission of any number of NTDUs from client devices (110, 112, 114) to a data processing device (100) via, at least, one or more edge devices (104, 106, 108) and/or an aggregator (116), which are operatively connected. In one or more embodiments, the one or more client devices (110, 112, 114) are operatively connected to one or more edge devices (104, 106, 108), which are operatively connected to an aggregator (116) (e.g., via a network (102)), which is operatively connected to a data processing device (100) to which the one or more client devices (110, 112, 114) seek to transmit to a data processing device (100).

In one or more embodiments, a network device (e.g., devices in the network (102), all or a portion of a data processing device (100), an aggregator (116), and edge devices (104, 106, 108)) may be a physical device that includes, but is not limited to, all or any subset of the following: persistent storage (not shown), memory (e.g., random access memory (RAM)) (not shown), one or more processor(s) (not shown), one or more network chips, one or more circuit components (e.g., wire, resistors, capacitors, transistors, inductors, integrated circuitry packages, printed circuit boards, diodes, comparators, etc.), one or more field programmable gate arrays (FPGAs), one or more application specific integrated circuits (ASICs), one or more complex programmable logic devices (CPLDs) and/or one or more physical network interfaces (which may also be referred to as ports). A network device may be connected to other devices via any operative connection.

In one or more embodiments, a network device includes functionality to receive NTDUs at any of the physical network interfaces (i.e., ports) of the network device, and to transmit NTDUs from any of the physical network interfaces of the network device.

One example of a network device is a lower layer device. In one or more embodiments, a lower layer device is a device that includes one or more physical layer switches configured to provide physical connections between ports of the lower layer switch. A physical layer switch may be implemented, at least in part, as a crossbar switch, which has multiple input and output lines arranged in a crossed pattern, with each intersection serving as a switch that may be open to prevent a connection between two ports, or closed to form a connection between two ports of the lower layer device.

Physical layer switches may include functionality to receive NTDUs from a given port of a lower layer device and, based on the configured connections of the physical layer switch, transmit the received NTDU, or any other NTDU, to one or more other ports to be transmitted toward whatever is connected to the output port.

As used herein, the term lower layer device may refer to devices that also include additional hardware (e.g., FPGA (s)) and/or software to allow for reconfiguration of the connections and other functionality. Such lower layer devices may, for example, function as reconfigurable patch panels. The reconfiguration may occur, for example, via a network administrator using management software to interact, over a network (102), with any of the hardware and/or software of the lower layer device to reconfigure the connections. Other functionality that may exist in a lower layer device, which may be enabled by additional hardware and/or software, includes, but is not limited to, media conversion, failover, data replication, aggregation, broadcast, monitoring, traffic sampling, multiplexing, filtering, etc.

Other examples of a network device include a higher level network device. Examples of a higher level network device include, but are not limited to, a layer 2 network switch, a router, a multilayer switch, a fiber channel device, an Infini-Band® device, etc. Higher level devices may include functionality to inspect all or certain portions of a NTDU in order to determine whether to: (i) drop the NTDU; (ii) process the NTDU; and/or (iii) transmit the NTDU, based on the processing, from a physical network interface or port on the higher level network device.

In one or more embodiments, a network device includes functionality to store (e.g., in persistent storage, in memory, in a register, etc.), any number of data structures (e.g., filtering information, buffering information, routing information base (RIB), queued and timestamped NTDUs, etc., forwarding information base (FIB), link state database, counters, etc.) for facilitating operation of at least some aspects of the network device.

Such structures may be stored in a data repository (not shown) included in and/or operatively connected to a network device. In one or more embodiments, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments, the network device data repository includes all or any portion of the persistent and/or non-persistent storage of the network device as described above.

In one or more embodiments, the system includes edge devices (104, 106, 108). In one or more embodiments, edge devices (104, 106, 108) are network devices that includes functionality to receive NTDUs from client devices (110, 112, and 114) and place an ingress timestamp on each NTDU as the NTDU arrives at the edge devices (104, 106, 108). In one or more embodiments, the edge devices (104, 106, 108) are time-synchronized such that they include and/or have access to one or more clocks having the same times. In one or more embodiments the edge devices are operatively connected to and aggregator (116) (e.g., via a network (102), via a directed wired connection, etc.).

In one or more embodiments, the system includes an aggregator (116). In one or more embodiments, an aggregator (116) is any hardware (e.g., circuitry), software, firmware, or any combination thereof that includes functionality to receive NTDUs from edge devices (104, 106, 108) at one or more ingress queues. In one or more embodiments, the aggregator facilitates global ordering of the NTDUs, using first-in-first-out (FIFO) buffers to allow for increased fairness in the delivery of time sensitive information. In one or more embodiments, the aggregator (116) is a network device. In one or more embodiments, an aggregator includes any number of ingress queues. Each ingress queue may be associated with a particular edge device.

In one or more embodiments, the aggregator (116) includes functionality to determine an order that NTDUs received by the aggregator (116) were received by edge devices (104, 106, 108). For example, in certain embodiments, the aggregator (116) uses merge sort to determine the sequence for processing and transmitting the NTDUs, which are stored in one or more ingress queues, to the data processing device (100) by the comparing the timestamps for the NTDUs at a head of each of the ingress queues in the aggregator (116) (discussed further below).

In one or more embodiments, if a NTDU arrives first at the aggregator from an edge device, the NTDU is placed at the head of an ingress queue. Additionally, a NTDU is moved to the head position once the NTDU in front of it is processed and transmitted to a data processing device (100).

In one or more embodiments, the aggregator (116) may be multi-tiered to provide multi-staged aggregation. In multi-staged aggregation, the streams from multiple aggregators may be transmitted to another upstream aggregator, where each lower level aggregator may be connected to one or more edge devices. In one or more embodiments, there are any number of aggregators arranged in a hierarchy, with each aggregator in the hierarchy capable of performing functionality described herein. An aggregator (116) may be operatively connected to the one or more data processing devices.

In one or more embodiments, an aggregator (116) may be or may include one or more components (e.g., a multiplexer using a first-in first-out (FIFO) buffer, an FPGA, etc.) that are directly connected (or operatively connected) to a data processing device (100). In one or more embodiments, an aggregator (116) is implemented as a separate device that includes an FPGA, which performs the aggregation, and that is operatively connected to the data processing device (100).

In one or more embodiments, any above-described system component may also include software and/or firmware stored in any data repository (not shown) and/or memory (not shown) (i.e., non-transitory computer readable mediums). Such software and/or firmware may include instructions which, when executed by one or more processors (not shown) included in and/or operatively connected to the component, cause the one or more processors to perform operations in accordance with one or more embodiments.

The instructions may be in the form of computer readable program code to perform one or more embodiments, and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to one or more embodiments.

While FIG. 1 shows a configuration of components, other configurations may be used without departing from the scope of the embodiments. For example, there may be any number of data processing devices, network devices, edge devices, client devices, etc., which may be arranged in any manner. Accordingly, embodiments disclosed herein should not be limited to the configuration of components shown in FIG. 1.

Figure 2:
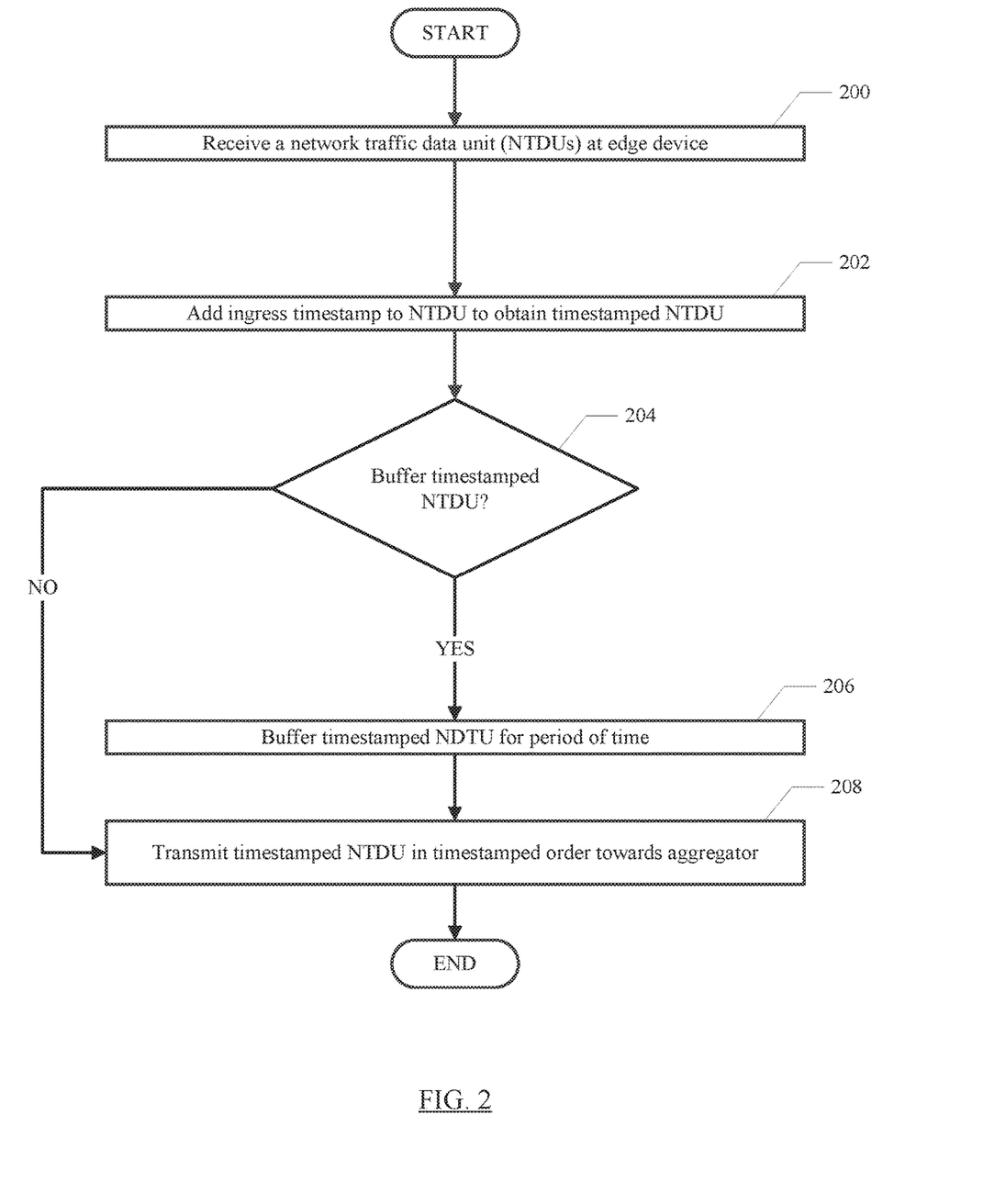
FIG. 2 shows a flowchart in accordance with one or more embodiments described herein.

FIG. 2 shows a flowchart describing a method for processing and distributing NTDUs in accordance with one or more embodiments.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, one or more NTDUs are received at an edge device from a client device. In one or more embodiments, the one or more NTDUs are intended for a data processing device and are intended to cause a data processing device to perform an action (e.g., order of one or more shares of a stock).

In Step 202, an ingress timestamp is added to the one or more NTDUs. In one or more embodiments, an ingress timestamp is any information in any format that is affixed in any manner to a NTDU that indicates a time at which the NTDU was received. In one or more embodiments, an ingress timestamp indicates a time at which a NTDU is received by an edge device. For example, an edge device may be configured to ascertain, from a clock, a time at which NTDUs are received and, if the NTDU has been determined to be time sensitive, to add an ingress timestamp that includes the ascertained time value.

In Step 204, a determination is made as to whether to buffer the one or more received timestamped NTDUs at the edge device. A NTDU may be buffered at the edge device for any reason. For example, the aggregator can send a notification to the edge device to hold the timestamped NTDU. This may allow flow control at the aggregator. If the one or more NTDUs are to be buffered, the method proceeds to Step 206. If, on the other hand, the one or more NTDUs are not buffered, the method proceeds to Step 208.

In Step 206, the timestamped NTDU is buffered for period of time. In one or more embodiments, buffering a NTDU at an edge device includes storing the NTDU in storage of the edge device, such as a queue. A NTDU may be buffered for any amount of time. For example, a request (e.g., from an aggregator) to buffer one or more NTDUs may include a length of time that the one or more NTDUs may be buffered. In another example, the entity that requested the buffering (e.g., the aggregator), may send an additional notification to the edge device to release the one or more buffered timestamped NTDUs.

In Step 208, an ingress timestamped NTDU is transmitted towards an aggregator in an ordered streamed according to the lowest timestamp, where the lowest timestamp may refer to the earliest timestamp placed on the NTDU as the NTDU arrives at the edge device. Said another way, the timestamped NTDUs that are transmitted from the edge device are transmit in the timestamped order (from lowest timestamp highest time stamp). This ordering lay be referred to as a local ordering.

Figure 3:
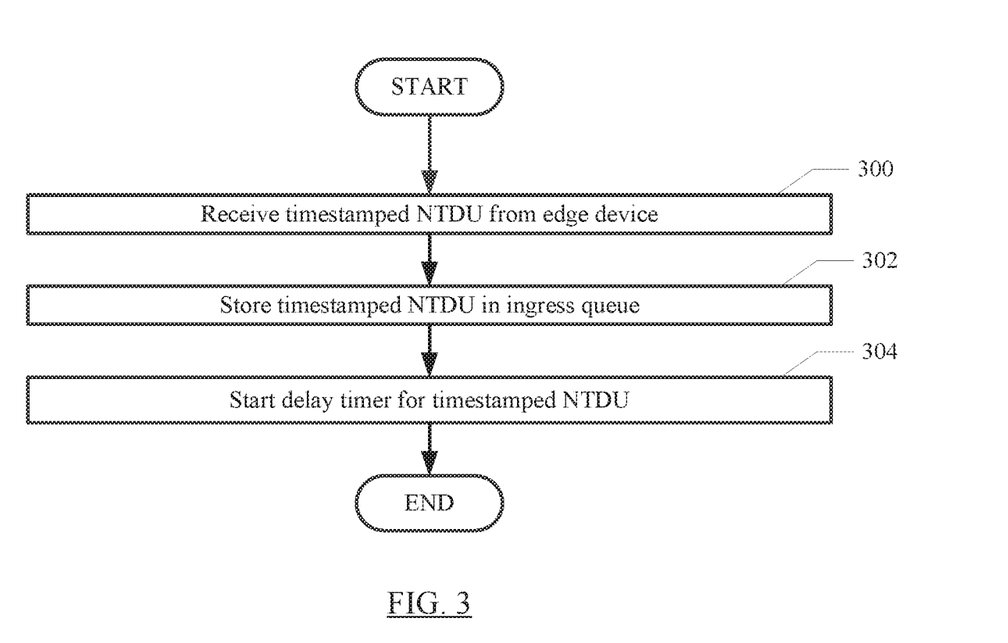
FIG. 3 shows a flowchart in accordance with one or more embodiments described herein.

FIG. 3 shows a flowchart describing a method for processing and distributing NTDUs in accordance with one or more embodiments.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 3, in Step 300, an aggregator receives one or more timestamped NTDUs from one or more edge devices. The one or more timestamped NTDUs may be received by the aggregator from the one or more edge devices in ordered streams (also referred to as locally ordered streams) according to the lowest timestamp added to the one or more NTDUs by the one or more edge devices.

In one or more embodiments, the aggregator can be multi-tiered to provide multi-staged aggregation. In such embodiments, NTDUs are received at lower level aggregators from respective edge devices. The lower level aggregators may subsequently process the NTDUs as described herein, and provide the resulting ordered NTDUs to a higher level aggregator, which again performs aggregator functionality as described herein. In one or more embodiments, the highest aggregator in the multi-tiered hierarchy of aggregators may aggregate and order NTDUs from all lower level aggregators in the hierarchy and be operatively connected to a data processing device.

In Step 302, one or more timestamped NTDUs are stored in an ingress queue. Each NTDU is stored in an ingress that is associated with the edge device. Further, within the ingress queue the NTDUs maintained their local ordering (i.e., the ordering that was determined based on the individual NTDU arrival times at the corresponding edge device). The aggregator may use at least a portion of the NTDU to determine the ingress queue in which to store the NTDU.

In Step 304, a delay timer is started for the timestamped NTDU stored in the ingress queue. In one or more embodiments, the initial value of the delay timer is set equal to a rest time. In one or more embodiments, a rest time is any amount of time that a NTDU is stored in an ingress queue. The rest time may be any amount of time that allows the aggregator to order the stored NTDUs from the various edge devices. For example, the rest time may be a minimum time period, which represents a worst case latency in transmission from the edge devices to the aggregator for the timestamped NTDU. In one or more embodiments, storing NTDUs in ingress queues for rest time increases fairness in delivery of time sensitive information to a data processing device. The rest time may be set on a per ingress queue basis in order to take into account the different latencies that may exist between the various edge devices and the aggregator. In one or more embodiments, the timer begins when the aggregator stores the timestamped NTDU in the ingress queue. The method shown in FIG. 3 may be performed for each received NTDU and result starting one delay timer per stored NTDU.

Figure 4:
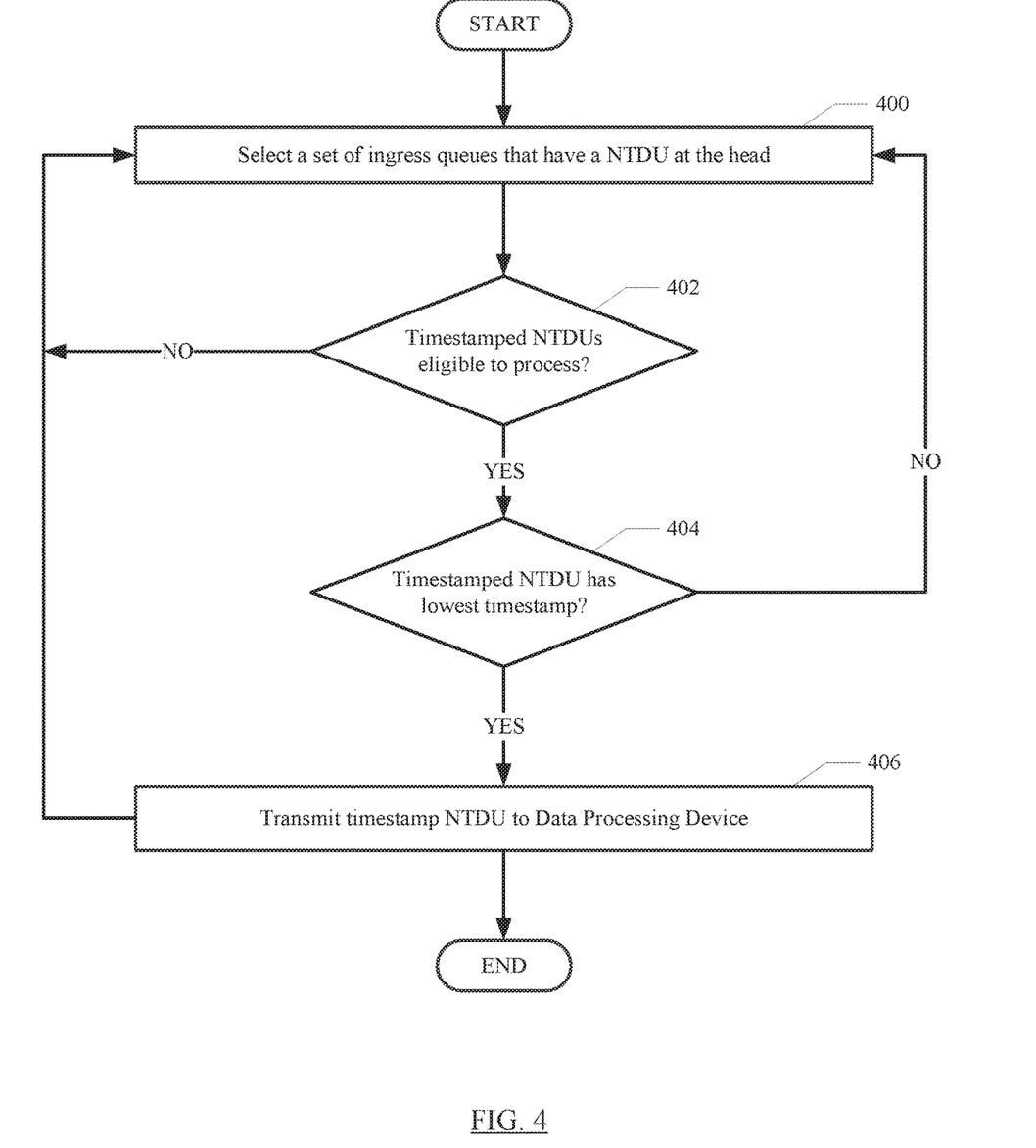
FIG. 4 shows a flowchart in accordance with one or more embodiments described herein.

FIG. 4 shows a flowchart describing a method for processing and distributing NTDUs by the aggregator in accordance with one or more embodiments.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 4, in Step 400, a set of one or more ingress queues with a timestamped NTDU at the head are processed. In one or more embodiments, if a NTDU arrives first at the aggregator, the NTDU is placed at the head of the appropriate ingress queue (as described above in FIG. 3). Additionally, a NTDU is moved to the head position once the NTDU in front of it (i.e., an NTDU with a lower timestamp) is processed and transmitted to the data processing device.

In Step 402, a determination is made as to whether each of the one or more timestamped NTDUs in the ingress queues selected in Step 400 are eligible to process. In one or more embodiments, a timestamped NTDU is eligible to process when certain criteria are met. One example of such a set of criteria includes: (i) the timestamped NTDU being at the head of the ingress queue, and (ii) the delay timer corresponding to the NTDU has expired. In another example, a NTDU may be eligible for processing if: (i) it is at the head of its ingress queue and (ii) there are eligible NDTUs in all of the other ingress queues in the set of ingress queues (as specified in step 400). In this scenario, the NTDU in the ingress queue may be eligible even though its corresponding delay timer has not expired.

Continuing with the discussion of FIG. 4, if no timestamped NTDU is eligible, the method returns to Step 400. If one or more of the timestamped NTDUs are eligible to process, the method proceeds to Step 404.

In Step 404, a determination is made as to which timestamped NTDU of the set of NTDUs that are eligible to process (as determined in Step 402) has the lowest timestamp. In one or more embodiments, the lowest timestamp may refer to the earliest timestamp placed on the NTDU upon arrival of the NTDU at the edge device. In one or more embodiments, the determination is made by the aggregator. In one or more embodiments, the aggregator makes such a determination using any scheme for comparing information about a set of data items.

One non-limiting example of such a scheme is a merge sort scheme. In one or more embodiments, a merge sort scheme selects two ingress queues (each which are locally order), and merges them into a final, sorted sequence (or order). For example, consider a scenario in which the aggregator has two ingress queues. In such a scenario, the aggregator uses merge sort to determine which NTDU has the lowest timestamp by receiving a different timestamped NTDU in each ingress queue. Once the timestamped NTDUs reach the head of their respective ingress queues, the aggregator compares the NTDUs in the ingress queues, and selects the NTDU at the head of an ingress queue that is eligible to process and has the lowest timestamp. If there is more than one NTDU in each queue, this process will continue until there is only one NTDU left. Once there is only one NTDU left in one or more of the queues, the NTDU must wait until the delay timer expires before proceeding to Step 406 to adjust for the difference of latency from the edge devices. If the timestamped NTDU at the head of the ingress queue does not have the lowest timestamp, then the method returns to Step 400. However, if the timestamped NTDU has the lowest timestamp, then the method proceeds to Step 406.

In Step 406, the processed eligible, lowest timestamped NTDU is transmitted to the data processing device for further processing (e.g., performing an action indicated by the NTDU). For example, the aggregator may identify a next-hop address corresponding to the data processing device, and modify the NTDU to include such an address. Using the process described above of selecting and sending the lowest timestamped NTDUs in order of their respective timestamps, the aggregator may send the NTDUs in ordered stream to the data processing device. In other words, following the steps set forth in FIG. 4 may cause the eligible NTDUs with the lowest timestamp to be sent in a first-in, first-out sequence to the data processing device in accordance with the ingress timestamp placed on the NTDUs by the one or more edge devices. The ordered sequence of NTDU transmitted from the aggregator may be referred to as a globally ordered sequence.

Example

FIGS. 5A-5H show an example in accordance with one or more embodiments. The following example is for explanatory purposes only and not intended to limit the scope of the embodiments. Additionally, while the example shows certain aspects of embodiments described herein, all possible aspects of such embodiments may not be illustrated in this particular example.

Figure 5A:
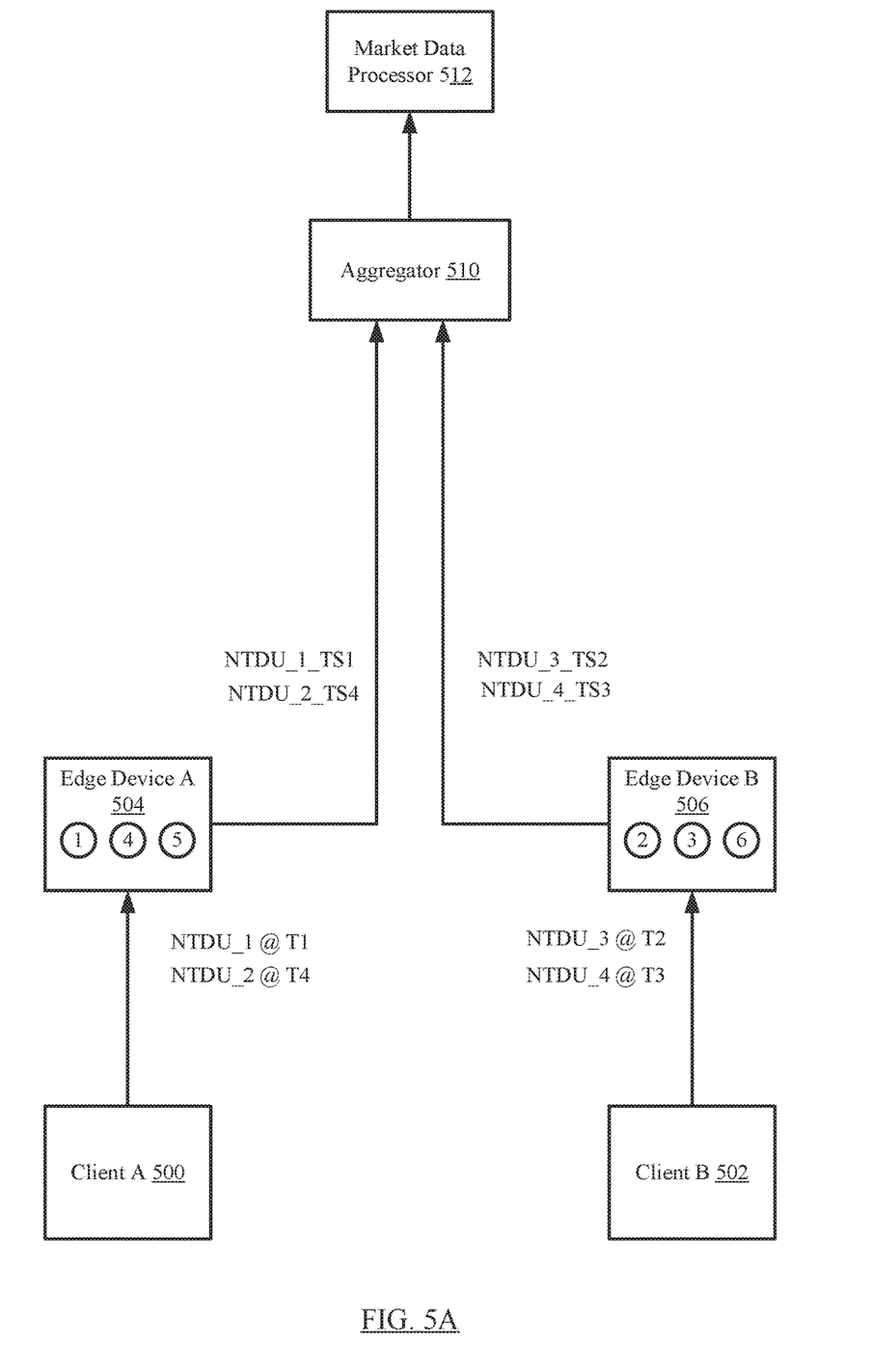
FIGS. 5A-5H show an example in accordance with one or more embodiments described herein.

Referring to FIG. 5A, consider a scenario in which a financial exchange has a market data processor (i.e., a data processing device) operatively connected to an aggregator (510). The aggregator (510) is operatively connected to edge device A (504) and edge device B (506). Edge device A (504) is operatively connected to client A (500). Edge device B is operatively connected to client B (502).

In such a scenario, in order to help ensure fairness, the market data processor (512) must receive NTDUs in globally ordered sequence. The market data processor may receive the NTDU with the lowest timestamp first, so that no one or more clients (500 and 502) receive an unfair advantage. Such an advantage may be realized via receipt by the market data processor of one or more NTDUs from a first client before one or more NTDUs of a second client when the NTDU(s) of the second client where received first at the network edge.

Continuing the example, edge device A (504) and edge device B (506) receive NTDUs in the following order from client A (500) and client B (502) and time stamps them in order in which they arrive at the edge devices (504, 506):

(1) Edge device A receives NTDU_1 at a time (T1) and timestamps the NTDU_1 as NTDU_1_TS1.

(2) Edge device A receives NTDU_2 at a time (T4) and timestamps NTDU_2 as NTDU_2_TS4.

(3) Edge device B receives NTDU_3 at a time (T2) and timestamps NTDU_3 as NTDU_3_TS2.

(4) Edge device B receives NTDU_4 at a time (T3) and timestamps NTDU_4 as NTDU_4_TS3.

(5) Edge device A transmits a locally ordered stream which includes NTDU_1_TS1 and NTDU_2_TS4 to the aggregator (410) at queue A.

(6) Edge device B transmits a locally ordered stream which includes NTDU_3_TS2 and NTDU_4_TS3 to the aggregator (410) at queue B.

In the above order, the timestamp T1 represents the earliest time at which a NTDU is received by any edge device, with T2, T3, and T4 each representing increasingly later times.

Referring to FIGS. 5B-5H, as each timestamped NTDU arrives at queue A or queue B, a delay timer is set when the timestamped NTDU arrives at the aggregator (510). Once the delay timer for a given NTDU has expired, the NTDU is available to be transmitted to the market data processor unless there is already a timestamp NTDU in each of the ingress queues. In this instance, NTDUs that are available to be transmitted and are at the head of their respective queues are compared, and the NTDU with the lowest timestamp is transmitted first.

Figure 5B:
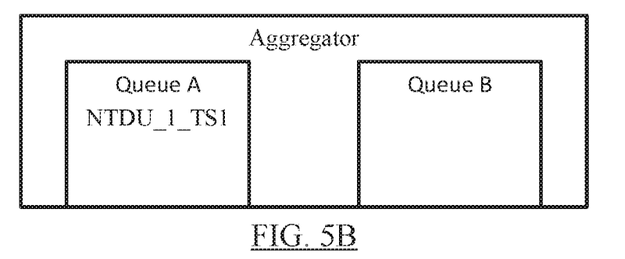
Figure 5C:
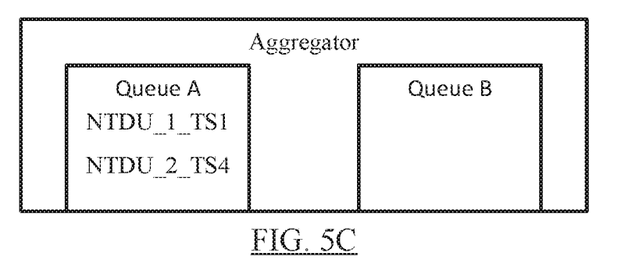
Figure 5D:
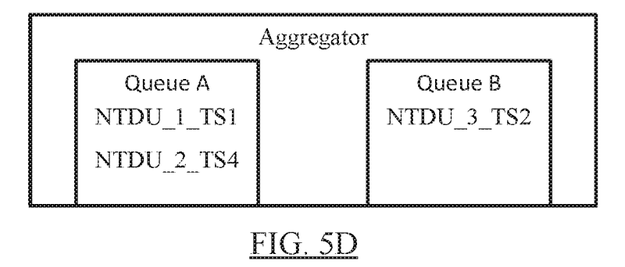

Continuing with the example, NTDU_1_TS1 arrives first at the aggregator (510) at queue A as shown in FIG. 5B. Next, NTDU_2_TS4 arrives at the aggregator (510) at queue A as shown in FIG. 5C. Then NTDU_3_TS2 arrives at the aggregator (510) at queue B as shown FIG. 5D. Here, the misordering of NTDU_1_TS1 and NTDU_2_TS4 in queue A and NTDU_3_TS2 in queue B relate to the difference of the network latency between the edge device A and edge device B and the aggregator. NTDU_1_TS1 has the lowest timestamp of all of the NTDUs at the head of queue A and queue B as shown in FIG. 5D (i.e., TS1 indicates an earlier arrival time at an edge device than TS2). Therefore NTDU_1_TS1 is transmitted to the market data processor (512) as shown in FIG. 5E.

Figure 5E:
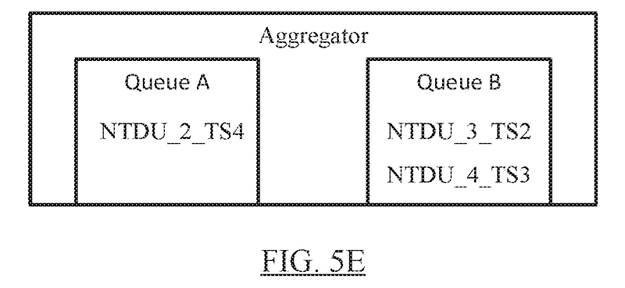

Thereafter, NTDU_4_TS3 arrives at the aggregator (510) at queue B as shown in FIG. 5E. NTDU_2_TS4 is compared to NTDU_3_TS2. NTDU_3_TS2 has the lowest timestamp of the NTDUs at the head of queue A and queue B. Therefore, NTDU_3_TS2 is transmitted to the market data processor (412), resulting in queue A and queue B as shown in FIG. 5F.

Figure 5F:
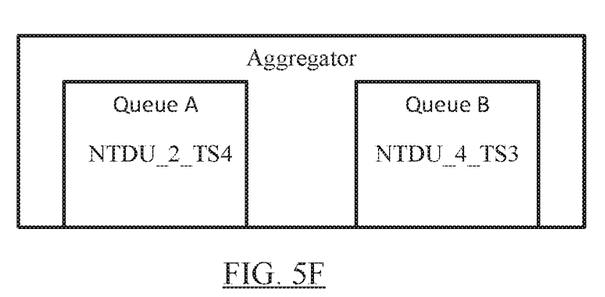
Figure 5G:
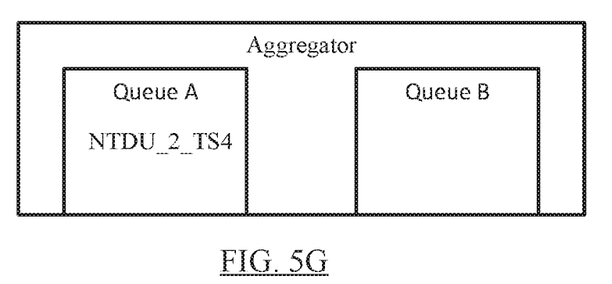
Figure 5H:
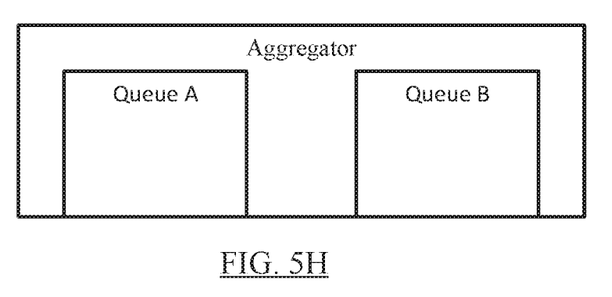

Next, NTDU_2_TS4 is compared to NTDU_4_TS3 as shown in FIG. 5F. NTDU_4_TS3 has the lowest timestamp between the two NTDUs. Therefore, NTDU_4_TS3 is transmitted to the market data processor (412), resulting in queue A and queue B as shown in FIG. 5G. This leaves NTDU_2_TS4 in queue A with no other NTDUs in queue B Once, the time delay for NTDU_2_TS4 has expired, NTDU_2_TS4 is transmitted to the market data processor (412), resulting in the empty queues as shown in FIG. 5H.

End of Example

The embodiments described herein, which cause a global ordering of locally ordered NTDUs received from a set of edge devices prior to transmission to a data processing device, allow for increased fairness in delivery of time sensitive information (e.g., market information, gaming information, real estate information, gambling information) to recipients that may use the information in some way.

While the embodiments has been described with respect to a limited number of embodiments, those skilled in the art, having benefit of this disclosure, will appreciate that other embodiments can be devised which do not depart from the scope of the embodiments as disclosed herein. Accordingly, the scope of the embodiments should be limited only by the attached claims.

What is claimed is:

1. A method for processing network traffic data units (NTDUs), the method comprising:
receiving, at an aggregator, a first set of locally ordered NTDUs from a first edge device;
receiving, at the aggregator, a second set of locally ordered NTDUs from a second edge device;
generating a globally ordered sequence of NTDUs using the first set of locally ordered NTDUs and the second set of locally ordered NTDUs;
transmitting the globally ordered sequence of NTDUs to a destination; and
starting a delay timer for at least one NTDU of the first set of locally ordered NTDUs when the NTDU is stored in an ingress queue in the aggregator,
wherein generating the globally ordered sequence of NTDUs is based, in part, on expiration of the delay timer.

2. The method of claim 1, wherein generating the globally ordered sequence of NTDUs is based on timestamps associated with each of the first set of locally ordered NTDUs, wherein the timestamps represents a time at which a corresponding NTDU was received by the first edge device.

3. The method of claim 1, wherein the first set of locally ordered NTDUs comprises a plurality of NTDUs ordered in accordance with a local ordering, wherein the local ordering is based on a time at which each of the plurality of NTDUs is received by the first edge device.

4. The method of claim 1, wherein generating the globally ordered sequence of NTDUs comprises determining whether a NTDU of the first set of locally ordered NTDUs is eligible for processing.

5. The method of claim 1, further comprising:
issuing, by the aggregator, a notification to the first edge device, wherein after the notification is issued, no NTDUs are received from the first edge device.

6. The method of claim 5, further comprising:
issuing, by the aggregator, a second notification to the first edge device, wherein after the second notification is issued, the aggregator receives NTDU from the first edge device, wherein the second notification is issued after the notification.

7. The method of claim 1,
wherein the first set of locally ordered NTDUs is stored in a first ingress queue of the aggregator,
wherein the second set of locally ordered NTDUs is stored in a second ingress queue of the aggregator.

8. The method of claim 7,
wherein the first ingress queue is associated with a first rest time,
wherein the second ingress queue is associated with a second rest time,
wherein generating the globally ordered sequence of NTDUs is based, in part, on the first rest time and the second rest time.

9. A method for processing network traffic data units (NTDUs), the method comprising:
receiving, at an aggregator, a first set of locally ordered NTDUs from a first edge device;
receiving, at the aggregator, a second set of locally ordered NTDUs from a second edge device;
generating a globally ordered sequence of NTDUs using the first set of locally ordered NTDUs and the second set of locally ordered NTDUs,
wherein generating the globally ordered sequence of NTDUs comprises determining whether a NTDU of the first set of locally ordered NTDUs is eligible for processing,
wherein the NTDU is eligible for processing when a delay timer associated with the NTDU expires; and
transmitting the globally ordered sequence of NTDUs to a destination.

10. The method of claim 9, wherein the delay timer is initially set to a rest time, wherein the rest time corresponds to a worst case transmission latency for the NTDU between the first edge device and the aggregator.

11. An aggregator, comprising:
a plurality of ingress queues comprising a first ingress queue and a second ingress queue;
a plurality of ports configured to receive network traffic data units (NTDUs);
wherein the aggregator is configured to:
receive, at the aggregator, a first set of locally ordered NTDUs from a first edge device;
receive, at the aggregator, a second set of locally ordered NTDUs from a second edge device;
generate an ordered sequence of NTDUs using the first set of locally ordered NTDUs and the second set of locally ordered NTDUs;
transmit the ordered sequence of NTDUs to a destination; and
issue a notification to the first edge device, wherein after the notification is issued, no NTDUs are received from the first edge device.

12. The aggregator of claim 11, wherein the destination is a second aggregator.

13. The aggregator of claim 11, wherein the aggregator is further configured to:
start a delay timer for at least one NTDU of the first set of locally ordered NTDUs when the NTDU is stored in an ingress queue in the aggregator,
wherein generating the ordered sequence of NTDUs is based, in part, on expiration of the delay timer.

14. The aggregator of claim 11, wherein the first set of locally ordered NTDUs comprises a plurality of NTDUs ordered in accordance with a local ordering, wherein the local ordering is based on a time at which each of the plurality of NTDUs is received by the first edge device.

15. The aggregator of claim 11, wherein generating the ordered sequence of NTDUs comprises determining whether a NTDU of the first set of locally ordered NTDUs is eligible for processing.

16. The aggregator of claim 15, wherein the NTDU is eligible for processing when a delay timer associated with the NTDU expires.

17. The aggregator of claim 16, wherein the delay timer is initially set to a rest time, wherein the rest time corresponds to a worst case transmission latency for the NTDU between the first edge device and the aggregator.

18. The aggregator of claim 11,
wherein the first set of locally ordered NTDUs is stored in the first ingress queue,
wherein the second set of locally ordered NTDUs is stored in the second ingress queue.

19. The aggregator of claim 18,
wherein the first ingress queue is associated with a first rest time,
wherein the second ingress queue is associated with a second rest time,
wherein generating the ordered sequence of NTDUs is based, in part, on the first rest time and the second rest time.

20. The aggregator of claim 11, wherein generating the ordered sequence of NTDUs is based on timestamps associated with each of the first set of locally ordered NTDUs, wherein the timestamps represents a time at which a corresponding NTDU was received by the first edge device.

21. The aggregator of claim 11, wherein the ordered sequence is a globally ordered sequence.

* * * * *